INVENTORS
James B. Black
Leonard H. Adams
by Wolf, Hubbard, Voit & Osann
ATTORNEYS

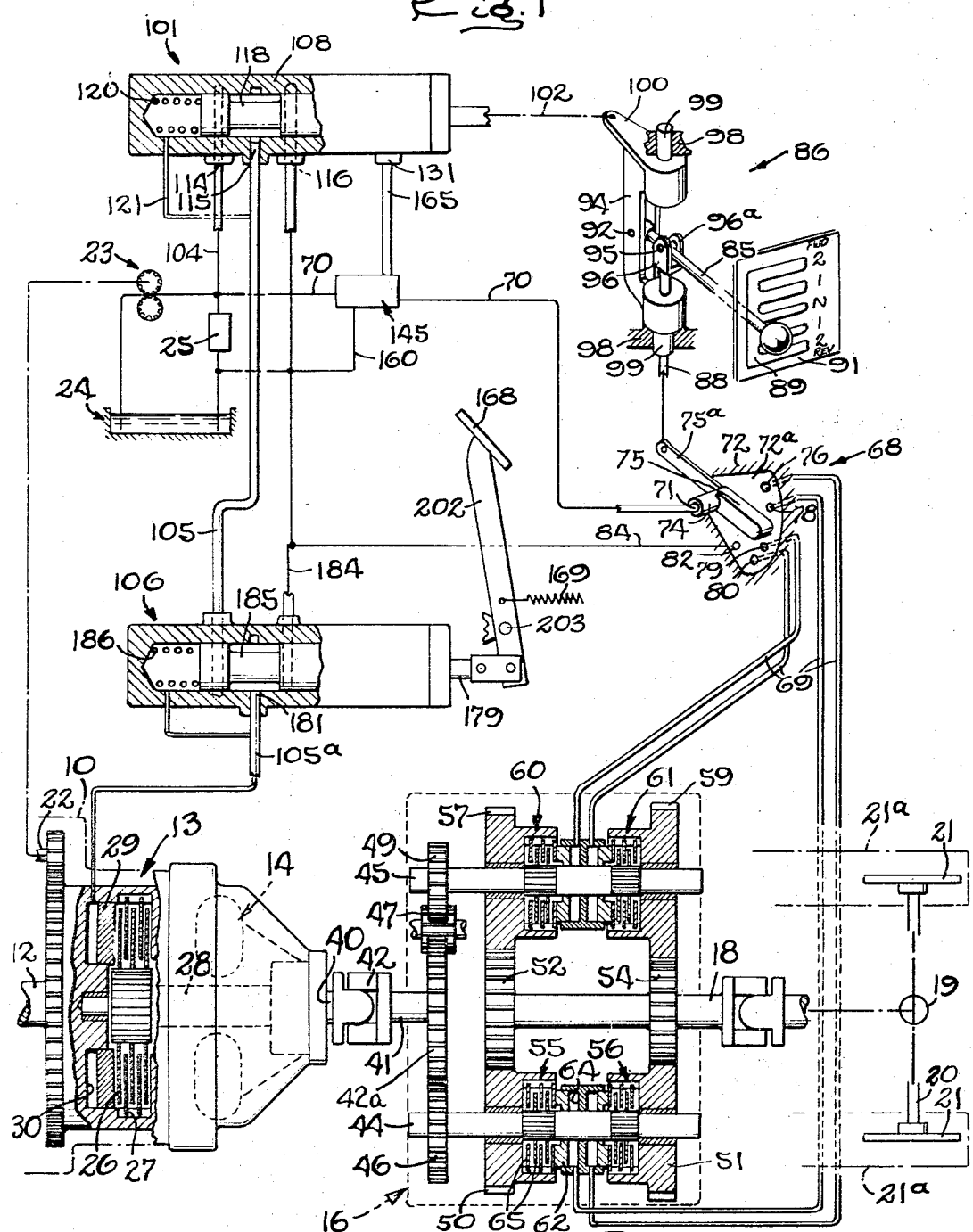

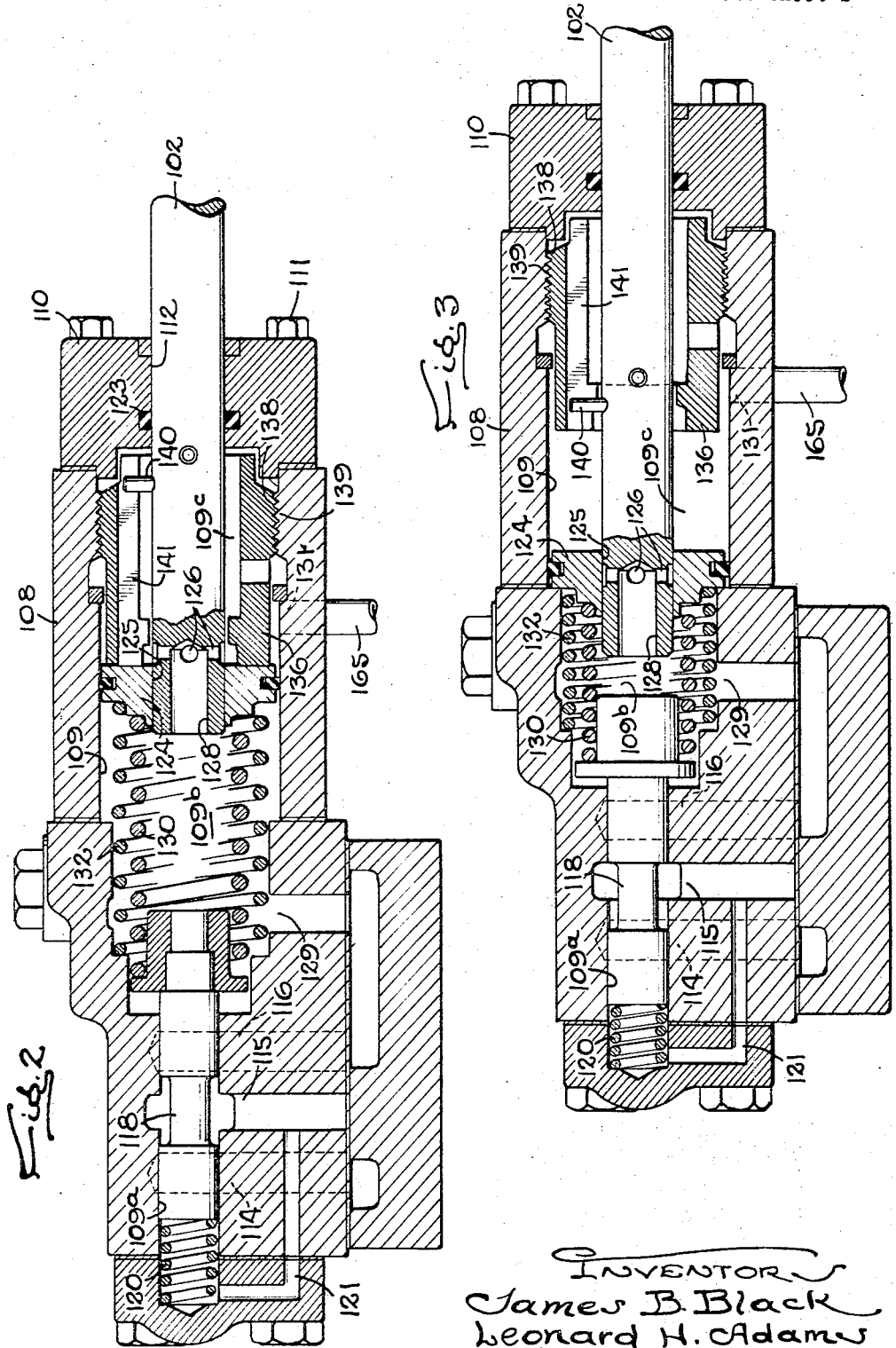

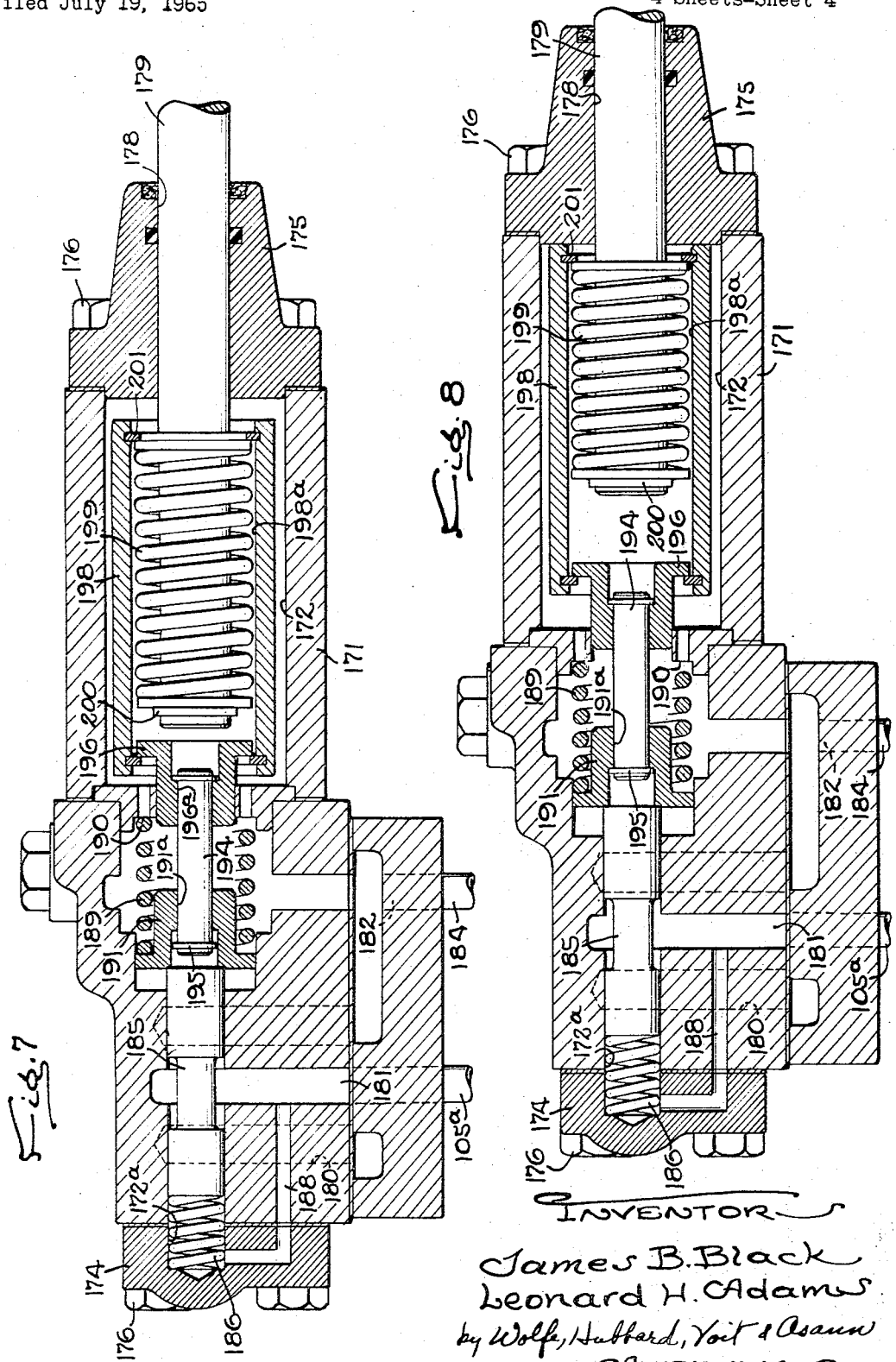

United States Patent Office 3,352,392
Patented Nov. 14, 1967

3,352,392
CLUTCH AND TRANSMISSION WITH DUAL
MODULATING FLUID CONTROLS
James B. Black and Leonard H. Adams, Rockford, Ill.,
assignors to Twin Disc Clutch Company, Racine, Wis.,
a corporation of Wisconsin
Filed July 19, 1965, Ser. No. 473,104
15 Claims. (Cl. 192—3.5)

ABSTRACT OF THE DISCLOSURE

A control system for a hydraulically actuated modulated clutch and a multi-ratio transmission drivingly interposed in tandem between the engine and the drive wheels of a tractor. The system includes a pair of adjustable pressure regulating valves connected in series between a pressure source and a hydraulic actuator which operates the modulated clutch. The pressure of the fluid supplied to the actuator, and thus the degree of engagement of the modulated clutch, may be varied by adjusting either valve, one valve being adjustable with a foot-operated control member and the other valve being adjustable with a hand-operated control member which also may be used to shift the transmission to a different drive ratio.

Background of the invention

This invention relates to a power system control, and more particularly, to a control for a power system employing a modulated clutch drivingly interposed between a prime mover and a load for regulation of the power transmitted to the load. While the invention may be employed in a wide variety of applications, it is especially useful in controlling the power transmitted from the engine to the track-driving wheels of crawler type tractors such as bulldozers, and will be described in that exemplary environment.

In the operation of bulldozers, the engine preferably is operated at a substantially constant speed so that auxiliary power-operated equipment, such as a hydraulically lifted earth scoop, receives full power. That is, the hydraulic pump for supplying pressure fluid to the auxiliary equipment is adequately driven by the engine to fulfill the power needs of the equiment. Yet, it is desirable to make the bulldozer highly maneuverable so that it can be driven at different speeds and in either direction without stalling or overloading the constant speed engine. For this purpose, a multi-ratio transmission is utilized in the drive train connecting the engine and the ground wheels for transmitting power from the constant speed engine in multi-speed ranges and forward and reverse drive.

For disconnecting the drive train while shifting the transmission, a primary clutch is interposed between the engine and the wheels. This clutch is usually a modulated type clutch which may vary the power transmitted within a selected speed range and which is constructed to withstand heavy shock, since the inertial forces and power that must be absorbed during engagement of the drive train of a bulldozer are quite large. The modulated clutch usually is provided with auxiliary cooling means to dissipate the heat generated within the clutch, and is constructed to be operated in a slipping engagement indefinitely.

Even though frequent changes in the ground speed of the vehicle are made possible by the use of the multi-ratio transmission and the modulated clutch, while still permitting the engine to run at a high enough speed to power the auxiliary drives, the need for these frequent changes in speed occurs just when the operator is the busiest thereby making it difficult for him to take full advantage of the capabilities of the bulldozer. For instance, in earth moving tasks the operator must raise and lower the blade constantly just when the greatest need arises for stopping, starting and reversing the drive direction of the bulldozer.

Sumary of the invention

It is, therefore, the primary aim of this invention to enable the operator to more easily start, stop, reverse and slow the ground speed of a bulldozer or the like so that he can devote more time to guiding or manipulating the auxiliary equipment of the bulldozer and better accomplish the job at hand. In accordance with this aim, the general object of this invention is to provide a novel control for a bulldozer, or the like, which slows, stops, starts or reverses the vehicle in response to the movement of control members are easily and selectively manipulated by the operator.

It is a more detailed object of this invention to enable the operator to slow or stop the machine by manipulation of either a hand or foot actuated control, whichever is most convenient at the time, which adjusts the degree of engagement, or completely disengages, the modulated clutch which drivingly connects the engine and the drive wheels.

Brief description of the drawings

FIGURE 1 is a fragmentary diagrammatic illustration of a drive system for a bulldozer or the like, utilized with an exemplary embodiment of the invention;

FIG. 2 is an enlarged cross-sectional view of the modulated clutch control valve shown in the position for disengaging the modulated clutch;

FIG. 3 is another view, similar to FIG. 2, of the control valve with the parts moved for effecting engagement of the modulated clutch;

FIG. 7 is an enlarged cross-sectional view of the deceleration valve shown in the position for engaging the modulated clutch;

FIG. 8 is a view similar to FIG. 7 of the deceleration valve with the parts moved to effect disengagement of the modulated clutch.

Detailed description

Figure 4:
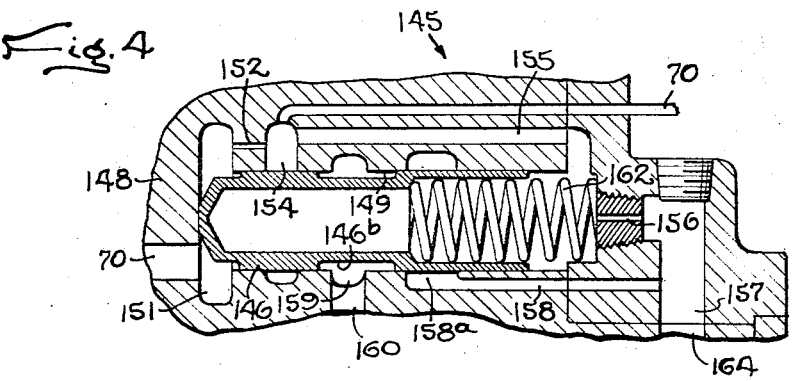
FIG. 4 is an enlarged fragmentary cross-sectional view of the flow sensing valve in the closed position.

While the invention has been shown and will be described in connection with an exemplary preferred embodiment, it will be understood that it is not intended to limit the invention thereto, but it is intended to cover all modifications and alternative constructions falling within the spirit and scope of the invention as expressed in the appended claims.

In the illustrative embodiment of the power drive system shown in FIG. 1, motive power is transmitted from the output shaft 12 of a prime mover or engine 10 through a disengageable modulated clutch 13, a torque converter 14, and a multi-ratio, reversible transmission 16 to an output shaft 18 which is coupled to the driven load, which in this instance are the traction wheels of a crawler type tractor, such as a bulldozer. In the following description, it will be assumed for purposes of discussion that the output shaft is connected through appropriate steering means (not shown), a differential 19 and an axle shaft 20, to the ground wheels 21 of the endless tracks 21a of a crawler type bulldozer, these latter elements being well known. The engine 10 is a diesel or any other suitable type, and it preferably is operated at a substantially high constant speed in order that it may supply input energy to auxiliary power systems by driving the auxiliary drive shaft 22 which is directly connected to the drive train between the engine and the modulated clutch so that disengagement of the modulated clutch does not disengage the auxiliary system drive. An example of such an auxiliary power system is a hydraulic pump 23 and associated fluid supply including a sump 24 and a pressure regulator 25 for supplying pressure fluid to the modulated clutch control.

The primary or modulated clutch 13 is designed to operate continuously with any degree of slippage, determined by the pressure with which its interleaved friction plates are pressed together. This clutch is sturdily constructed and capable of engaging and disengaging under full speed and load, particularly because of the cushioning effect of the tandem-connected torque converter 14. Further details regarding the modulated clutch, and the cooling thereof may be had by reference to the copending application of Conrad Hilpert, Ser. No. 187,741, filed Apr. 16, 1962, and now Patent No. 3,202,018. It will suffice here simply to observe that interleaved sets of friction discs 26 and 27 respectively splined to the engine flywheel and the torque converter input shaft 28 are urged into engagement by a modulating actuator including a piston member 29 which is moved proportionally to the pressure of hydraulic fluid introduced into an annular chamber 30. The greater the pressure in that chamber, the more the piston is moved to increase the frictional engagement of the discs, resulting in less slippage of the latter and an increase in the driven speed of the torque converter input shaft.

The torque converter 14 may be any one of several known types having a fluid reservoir and rotating vanes for torque transmittal between the converter input shaft 28 and a converter output shaft 40. The output shaft 40 connects with a transmission input shaft 41 through a universal coupling 42. The multi-ratio transmission 16 may also take any one of a variety of specific forms but, in general terms, it includes a plurality of clutches engageable in different patterns or combinations to establish selectively any one of a plurality of drive ratios between its input shaft 41 and the output shaft 18. As here shown, the input shaft 41 is formed with an input gear 42a which drives forward and reverse layshafts 44 and 45. Such drive of the forward layshaft occurs directly through a spur gear 46, while drive of the reverse layshaft is through an idler gear 47 to a spur gear 49. The two layshafts are thus driven in opposite directions.

To provide two ratios of forward drive, two gears 50 and 51 are journaled on the layshaft 44 and respectively meshed with gears 52 and 54 rigidly carried on the output shaft 18. Multi-disc clutches 55 and 56 are selectively engageable to connect the gear 50 or the gear 51 to the layshaft 44, thereby to establish first or second forward drive ratios. Similarly, two gears 57 and 59 are journaled on the reverse layshaft, constantly meshed with gears 52 and 54 on the output shaft, and selectively locked to the reverse layshaft by engagement of clutches 60 or 61, respectively, thereby to drive the output shaft 18 in a reverse direction with either of two ratios. Thus, by engaging clutches 55, 56, 60 or 61, the transmission 16 is set to produce first forward, second forward, first reverse, or second reverse drive ratio between the input shaft 41 of the transmission and the output shaft 18 of the power system. Each of the four transmission clutches is associated with a selectively energizable actuator to control its engagement or release. While these and other actuators shown and used in the exemplary embodiment can be either mechanically or electrically energized, in this instance, each clutch includes a piston 62 movable within a chamber 64 in response to the introduction of pressure fluid into the chamber so as to compress and drivingly engage interleaved friction discs 65.

The admission of pressure fluid from the pump 23 into the four clutches, or the venting of fluid from the clutches back to the sump 24, is controlled by regulation of a selector valve 68 which is connected to each of the piston chambers 64 by a hydraulic conduit 69. To transmit pressure fluid to the valve, a fluid conduit 70 extending from an output line of pump 23 connects with an inlet port 71 in the housing 72 of the valve. Journaled to pivot about a shaft 74 is a hollow selector pipe 75 which is alined to receive fluid from the inlet port and transmit it to one of the outlet ports 76, 78, 79 or 80, each connecting with one of the conduits 69, and each positioned to aline one at a time with the mouth of the pipe 75 as it is pivoted about the shaft. A detent mechanism (not shown) holds the selector pipe in alinement with each port after it is so positioned. By alining the pipe with one of the outlet ports, pressure fluid is supplied from the conduit 70 to a conduit 69 to actuate one of the transmission clutches and thus shift the transmission to the associated drive ratio. At the same time, the other outlet ports are opened to an interior cavity 72a in the housing which connects through a port 82 and attached conduit 84 to the sump 24, thereby assuring that the other clutches are not pressurized and thereby engaged.

In accordance with the present invention, a control is provided for shifting the drive ratio of the transmission and for regulating the engagement of the modulated clutch in response to movement of one or more control members which are easily and selectively manipulated by the operator. At least one control member may be moved into any one of a plurality of positions to select a transmission drive ratio, with the control, in response to such movement, acting to automatically disengage the modulated clutch, shift the transmission drive ratio, and reengage the modulated clutch in that order. To vary the speed within each drive ratio, the degree of engagement of the modulated clutch is regulated selectively by either a handle or a pedal so that the vehicle may be accelerated or slowed either by hand or by foot as may be convenient for the operator.

With the present invention, dual controls are provided for varying the speed of the vehicle with the operator being able to set the maximum vehicle speed by manipulation of either control. To these ends, a pair of pressure regulators or control valves 101 and 106 are connected in series in a pressure line 105 which supplies pressure fluid for engagement of the modulated clutch 13. Means are provided for actuation of either control valve to adjust the maximum pressure of the fluid supplied to the clutch, and thereby set the maximum degree of engagement of the clutch.

To regulate the control valve 101, a control member in the form of a handle 85 is connected through a control assembly 86 and a rod 88 to an extension 75a on the selection pipe 75 of the selector valve 68. The handle may be moved by the operator into various slots within an aperture 89 in a control plate 91 and corresponding to the second forward, first forward, neutral, first reverse and second reverse drive ratios of the transmission. The handle is pivotally attached to a yoke 94 and the ears 96a of a collar 96 on the end of rod 88 by pins 92, 95, respectively. The yoke is pivotally supported at top and bottom by trunnions 99 journaled in the frame 98 and providing a bearing for the rod 88 at the bottom, such that sidewise movement of the handle pivots the yoke and an attached ear 100 about a vertical axis, while vertical movement of the handle moves the rod 88 up and down to actuate the selector valve.

Sidewise movement of the handle 85 within one of the aperture slots between the ends thereof varies the engagement of the modulated clutch, and movement of the handle out of a slot to shift the transmission drive ratio automatically disengages the modulated clutch to disconnect the drive train during the time the transmission is being shifted. For these purposes, a pressure regulating means in the form of the modulated clutch control valve 101 is connected by a rod 102 to the ear 100 on the control assembly. This control valve receives pressures fluid from the pump 23 through a hydraulic line 104 and is connected to supply pressure fluid to the modulating actuator of the modulated clutch by hydraulic lines 105 and 105a connected through a decelerator valve 106.

As shown in FIGS. 2 and 3, the control valve 101 includes a housing 108 in which an elongated internal cavity 109 is formed opening to one end of the housing, with the open end closed by an end cap 110 fastened by bolts 111 to the housing and having a cylindrical opening 112 extending therethrough alining with the cavity. The portion 109a of the cavity opposite to the cap is cylindrically shaped with a pressure fluid inlet port 114, a pressure fluid outlet port 115 and a sump port 116 connecting therewith. A valve spool 118 is disposed for movement back and forth in the cavity, with movement to the right (see FIG. 2) closing off the inlet port, and movement to the left (see FIG. 3) uncovering the inlet port and allowing fluid to pass to the outlet port, with the pressure of the flow from the outlet port being equal to the pressure of the fluid entering the inlet port minus the pressure drop at the inlet port, as determined by the positioning of the spool. A spring 120 is positioned between the left end of the cavity 109a and the spool to urge the spool to the right, or toward the inlet port closing position. A passage 121 connecting the outlet port 115 to this end of the cavity allows fluid at outlet port pressure to exert a force on the spool urging it to the right making the force necessary to move the spool to the left to open the inlet port be directly proportional to the pressure of the fluid passing through the outlet port, plus the relatively small force exerted by the spring 120.

To actuate the spool with movement of the handle 85, the rod 102 connecting with the ear 100 on the control assembly extends through the opening 112 in the end cap, with oil seals 123 sealing against oil leakage along the rod as it is moved back and forth. The rod 102 passes through a center opening 125 in a pressure rise piston 124 positioned for reciprocating movement in the enlarged right end of the internal cavity 109 of the valve, and dividing it into a sump cavity 109b and a pressure cavity 109c. A series of orifices 126 in the side of the rod connects with an internal passage 128 extending to the rod end which projects into the sump cavity. A sump port 129 connects the sump cavity to a fluid line connecting with the sump 24. Extending between the pressure rise piston and the spool is a spring 130 which transmits a force to the spool proportional to the positioning of the piston, with the force naturally increasing as the piston is moved to the left in the cavity 109.

To open the valve, i.e., move the spool to the left to decrease the pressure drop across the inlet port and thus increase the pressure passing through the outlet port, pressure fluid is introduced into the cavity 109c through a pressure fluid inlet 131 which forces the pressure rise piston to the left to compress the spring 130. The spring, in being compressed, exerts an increasingly larger force on the spool moving it to the left. Movement of the piston ceases when flow occurs to the cavity 109c through the orifices 126 and passage 128 in the rod to the cavity 109b to hold the fluid pressure in cavity 109c constant. The fluid pressure in cavity 109c is stabilized at that necessary to exert a force on the piston sufficient to balance the opposing forces on the piston resulting from the spring 120 and the pressure of the outlet port fluid in the spring cavity acting to move the spool to the right.

The piston thereby reaches an equilibrium position where the forces on the spool are equal and both the spool and piston will remain motionless, since an increase in the forces on the piston in either direction merely moves the piston to uncover or cover the orifices 126 and cause an increase or decrease, whichever the case may be, in the pressure of the fluid in cavity 109c to again equalize the forces thereon. Also, movement of the rod to the right uncovers the orifices 126 and the pressure rise piston moves to a new position to the right as increased flow through the rod occurs, to thereafter assume a new position even with the orifices 126. A spring 132 acts to return the piston to the right when the pressure in cavity 109c is decreased.

By this construction, all the force necessary to move the spool to the left against the action of the outlet fluid pressure is supplied by the pressure fluid introduced in the pressure cavity 109c and the only force necessary to actuate the valve is that necessary to move the rod. Also, the handle 85 and stem 102 remain where positioned if the handle is released since there is no other force on the rod urging it in either direction.

From the foregoing it can be seen that movement of the handle 85 sidewise to move rod 102 back and forth regulates the pressure drop across the valve 101 to vary the pressure of the fluid supplied to the modulating actuator. In this manner, the degree of engagement of the modulated clutch is controlled by moving the handle sidewise in any one of the drive ratio selection slots in the plate 91. Movement of the handle out of any of the slots moves rod 102 to the right extent of travel which permits the spool to completely close the inlet port 114, as shown in FIG. 2, thereby automatically disengaging the modulated clutch as an incident to shifting the drive ratio of the transmission.

Because of manufacturing tolerance and the very nature of actuators in general, fluid actuators for clutches ordinarily do not begin immediate engagement of the clutch plates the instant pressure fluid is introduced into the piston cavity, in fact, a considerable time delay generally occurs before engagement of the clutch begins. This is partly due to the need for charging the evacuated fluid conduit system with hydraulic fluid, and partly due to end play in either the clutch or the actuator, or both. To lessen this time delay, the control valve includes means to maintain the fluid system leading to the modulated clutch charged with pressure fluid of a sufficiently low pressure so as not to cause engagement of the clutch plates, but of sufficient pressure to keep the system charged with hydraulic fluid, so that closely following actuation of the control valve, clutch engagement begins. For this purpose, low pressure fluid is maintained in the conduits 105 and clutch cavity 30, by holding the control valve open a very slight amount at all times, with the flow of fluid passing from the outlet port sufficient to make up for any leakage in the system, and yet at a low enough pressure so as not to move the piston and cause engagement of the clutch plates.

Since the requirements of each individual clutch and fluid system vary, means is provided to adjust the pressure of the fluid charging the system by adjusting the limit of movement of the pressure rise piston to the right, thereby adjusting the limit of travel of the spool to the right as it covers the inlet port. For this purpose, a sleeve 136 is positioned in the cavity 109c to serve as a stop for the piston, held in place by external screw threads 138 thereon which interfit with screw threads 139 on the inside wall of the cavity. The rod includes a pin 140 which interfits with a slot 141 in the sleeve extending along the direction of rod movement. The rod may move unhindered in the longitudinal direction for normal valve actuation, while rotation thereof causes the pin to encounter the slot walls and turn the sleeve to advance it longitudinally along the supporting screw threads. Rotation of the sleeve in the cavity in one direction moves it to the right, and rotation in the other direction moves it to the left, resulting in a like movement of the closed position of the pressure rise piston and the spool. Shifting the closed position of the spool to the right or left respectively increases and decreases the pressure drop across the fluid inlet, and thereby decreases and increases, respectively, the pressure of the fluid charging the modulated clutch fluid system when the modulated clutch is disengaged. By this construction, the rod may be rotated after the control valve is installed in a power system to adjust the charging fluid pressure for meeting the requirements of that particular modulated clutch fluid system, and thus assure quick engagement of the clutch following actuation of the control valve.

Figure 5:
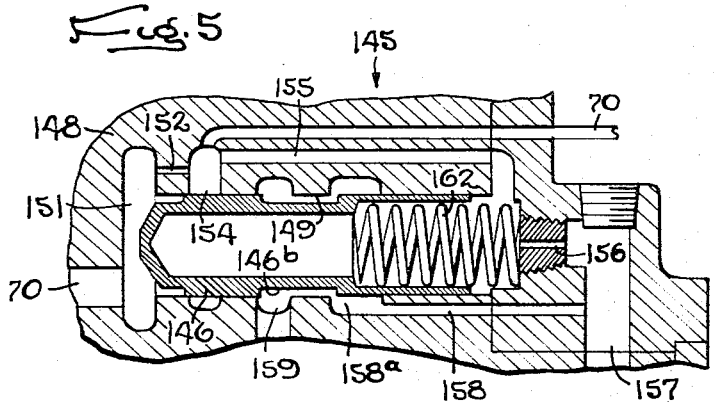
FIG. 5 is a view similar to FIG. 4 with the valve actuated to the partially open position.
Figure 6:
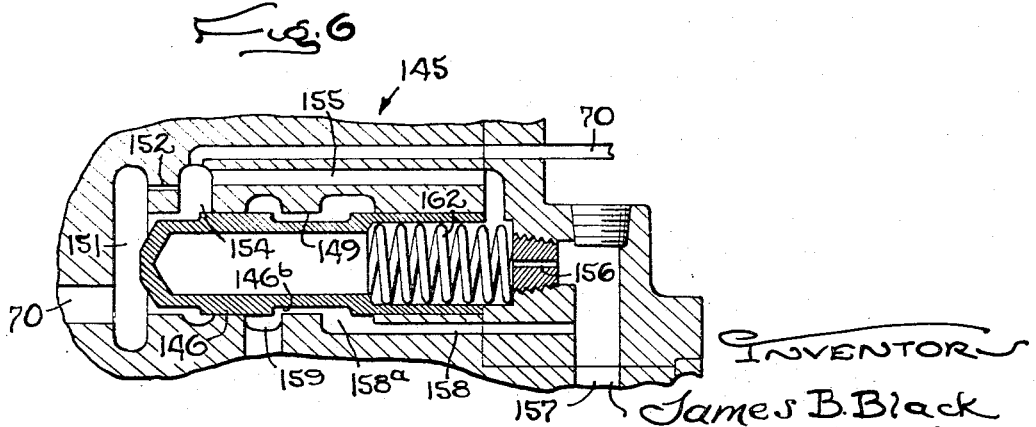
FIG. 6 is a view similar to FIG. 4 with the valve actuated to the full open position.

The modulated clutch is held disengaged until the transmission clutches are engaged during a drive ratio shift of the transmission, thus assuring that the shock of engaging the drive train is absorbed by the modulated clutch rather than the then-engaged transmission clutch. Movement of the shifting handle 85 into one of the drive ratio slots to shift the transmission to a new drive ratio, actuates the selector valve and permits fluid flow through the conduits 70 and 69 to the selected transmission clutch as before explained. Means are provided to sense the fluid flow to the transmission clutch actuators and hold the modulated clutch disengaged until the flow ceases, and thereafter on the cessation of fluid flow, signal that the transmission clutch is engaged. This means takes the form of a flow sensing valve 145 in conduit 70 (see FIGS. 4, 5 and 6) which, as a result of fluid flow through the conduit, is actuated from a first condition where a valve member 146 is positioned to the left (as shown in FIG. 4) to a second condition where the valve member is shifted to the right (as shown in FIG. 6). This valve comprises a housing 148 having an internal cavity 149 in which the valve member is positioned for reciprocal movement between the positions just described. Conduit 70 leading from the pump 23 connects with a conduit 151 in the housing. An orifice 152 connects the downstream end of conduit 151 with a port 154 leading to the valve cavity 149, with conduit 155 leading from port 154 to the right end of the cavity. The downstream side of conduit 70 also connects with port 154 and extends on to the selector valve. An orifice 156 connects with the right end of cavity 149 and extends to a conduit 157 while conduit 158 connects conduit 157 and a port 158a in the side of the housing leading to cavity 149 and adjacent a port 159 positioned to aline with an indent 146b in the side of the valve member. This indent is positioned to permit fluid flow between ports 158a and 159 when the valve member is actuated to the right. A conduit 160 connects port 159 to the sump 24.

In operation, a spring 162 urges the valve member 146 to the left position (see FIG. 4) and, assuming there is no fluid flow through conduits 151 and 70, the valve member upstream of the orifice 152 exposed to conduit 151 and the downstream side of the valve member connecting with conduit 155, are exposed to equal fluid pressures resulting in the valve member being held in this position by the spring 162. With the advent of fluid flow through conduit 70, resulting from opening the selector valve to permit fluid flow to one of the clutch actuators, the pressure on the downstream side of the valve member drops thus lowering the pressure of the fluid in conduit 155 and causing a difference in fluid pressures on the upstream and downstream sides of the valve member. Since the pressure in conduit 151 is now higher, the valve member is moved to the position shown in FIG. 5. Fluid flow now passes through passage 151, orifice 152 and on through the conduit 70, with the pressure drop across the orifice still resulting in unequal fluid pressures acting on the valve member to urge it to the right. The valve member now moves past port 154 (see FIG. 6) to partially by-pass fluid flow around the orifice 152 and increase the flow through conduit 70 for quicker actuation of the transmission clutch. The valve member remains in the second condition, i.e., positioned to the right in FIG. 6, so long as flow continues through conduit 70 indicating the selected clutch has not yet been fully engaged because of the pressure drop across the orifice 152. After the selected transmission clutch is fully engaged, the flow to the associated actuator ceases and the pressure on the downstream side of orifice 152 rises to equal that in conduit 151, thereby equalizing the fluid pressures acting on the valve member to allow it to move back to the left position (as shown in FIG. 4) under force of the spring.

When the valve member moves to the right, it allows fluid flow from the port 158a to the port 159 through the indent 146b to thereby connect the conduits 158 and 157 to the sump. Conduit 157 connects at port 164 to conduit 165 which extends to port 131 of the modulated clutch valve 101 (see FIGS. 1, 2 and 3). Cavity 109c of the control valve thus receives pressure fluid for actuation of the pressure rise piston through conduits 165, 157, cavity 149, conduits 155, 151 and 70 connecting to receive pressure fluid from the pump 23. When the valve member 146 is actuated to the right, conduits 165 and 158 are connected to the sump, thus dumping any pressure fluid in cavity 109c so long as the flow sensing valve is in this position indicating the transmission clutch is not fully engaged. When the flow ceases, indicating that the shifting of the transmission is completed, the valve member again moves to the left, pressure fluid may flow from conduits 70, 155 and 157 through conduit 165 to the control valve cavity 109c as heretofore described, and the modulated clutch is thereafter engaged by actuation of the spool 118 to the left to again permit the flow of pressure fluid to the modulating actuator.

Engagement of a drive train such as the one described herein, especially after shifting the drive ratio, frequently strains the entire power system since the speed of rotation of the drive train components connecting with each set of plates of the clutch may be different and the inertial load on each is great. The clutch must equalize these speeds by slippage between the plate sets, before final engagement of the drive train can be made. To minimize the shock and wear accompanying such engagement, this control automatically engages the modulated clutch slowly by opening control valve at a programmed rate, for a slow increase in the pressure of the fluid supplied to the clutch. For this purpose the orifice 156 is positioned in the pressure line 157 connecting with conduit 165 through which pressure fluid is supplied to cavity 109c for actuating the pressure rise piston. The rod may be moved to the left at any speed, and the pressure rise piston will follow to move the spool at a rate determined by the rate of flow of pressure fluid through this orifice and into the cavity 109c. After each drive ratio shifting, or movement of the handle 85 to engage the modulated clutch, the clutch is engaged at a slow programmed rate to lessen wear and shock to the clutch and drive train.

As heretofore described, movement of handle 85 moves rod 102 to set the pressure drop across valve 101 and thereby set the pressure of the fluid flowing to the modulating actuator. Added versatility in the control system is provided in allowing the operator to decelerate or reduce the ground speed of the bulldozer by actuaton of a foot pedal 168 (see FIG. 1) which may be depressed against the action of a spring 169 to selectively reduce the degree of engagement of the modulated clutch. The decelerator valve 106 is associated with the foot pedal, which is connected between conduits 105, 105a in series flow relationship with the control valve 101. This valve may be actuated to selectively reduce the pressure of the fluid passing therethrough in a manner similar to that of the control valve, with the exception that the pressure regulation is proportional to the actuation of a foot pedal on the bulldozer, and the valve is spring biased so that when the pedal is released, the valve will open.

As shown in FIGS. 7 and 8, the decelerator valve includes a housing 171 having an internal cavity 172 closed at each end by caps 174, 175 fastened to the housing by bolts 176. Cap 175 includes a center opening 178 through which an actuating stem 179 extends. Connecting with the cavity portion 172a adjacent the end cap 175 is an inlet port 180 to which conduit 105 is attached extending from the outlet port 115 of the control valve, an outlet port 181 with attached conduit portion 105a leading to the modulated clutch, and a port 182 connected with conduit 84 leading to the sump by conduit 184. A spool 185 in cavity 172a is disposed to move back and forth and vary the pressure drop effected on pressure fluid passing from the inlet to the outlet ports of the valve. A spring 186 disposed adjacent the end cap 174 urges the spool to the right to close off the inlet port, while an internal fluid passage 188 connects the outlet port with the cavity 172a at the left of the spool so that there is exerted on the spool urging it to the right a force directly proportional to the pressure of the fluid passing from the valve.

The spool is biased to the left, or open, position by a compression spring 189 acting between a stationary spring seat 190 and a piston 191 positioned to abut the right end of the spool. To allow the spool to move to the right or closed position under the force of the spring 186, a stub shaft 194 extends through a center opening 191a in the piston 191 and is locked therein by a snap ring 195. The other end of the stub shaft passes through a center opening 196a in a connecting member 196, which is locked in the cylindrical opening 198a of the sleeve 198 fitting around the valve actuating stem. A compression spring 199 locked between the stem and connecting member by snap rings 200 and 201, respectively, transmits a force to this sleeve resulting from a force moving the stem to the right.

To disengage or reduce the engagement of the modulated clutch, the decelerator valve decreases the pressure of the fluid passing from the control valve 101 to the clutch. To actuate the valve, the operator depresses the clutch foot pedal 168 against the pull of spring 169 (see FIG. 1), which acts through a lever arm 202 pivotally supported at 203 to move the valve stem 179 to the right. The valve stem, acting through the spring 199, sleeve 198, piston 196 and stub shaft 194, moves the piston 191 to the right thus compressing the spring 189 to allow the spool to move right under the force of spring 186 and the pressurized outlet fluid acting on the left end of the spool, to reduce the inlet port opening. The pressure of the fluid passing to the modulated clutch is thereby reduced in proportion to the movement of the clutch pedal, for a like reduction in engagement of the modulated clutch serving to slow or stop the bulldozer with no change in the operating speed of the engine. Release of the pedal 168 permits the stem, connecting members and spool to move left to again open the decelerator valve and permit fluid flow from valve 101 to the modulated clutch without any appreciable pressure drop.

As explained, the operator may control the engagement of the modulated clutch by actuation of the hand manipulated handle 85 or the foot manipulated pedal 168 to thereby adjust the ground speed of the bulldozer. Further, the modulated clutch is automatically disengaged when the handle 85 is moved to shift the transmission, and automatically reengaged at a programmed rate only after the transmission is properly shifted to the newly selected drive ratio.

We claim as our invention:

1. In a system for driving a load from a prime mover including a multi-drive ratio transmission and a modulated clutch drivingly connected between the prime mover and the load, a modulating actuator connected for engaging said modulated clutch when supplied with pressure fluid and to a degree proportional to the pressure of the fluid supplied thereto, a source of pressure fluid, a first fluid conduit connecting said modulating actuator and said pressure fluid source, first and second pressure regulators individually adjustable between the open and closed positions and connected in said first conduit, a plurality of fluid actuators adapted when supplied with pressured fluid in preselected patterns to set said transmission in the drive ratios, a first control member including a handle movable between a plurality of positions each corresponding to one of the drive ratios of the transmission, said handle being movable between a first point and a second point when disposed in each of said positions, a second control member including means for adjusting said second pressure regulator, a selector valve connecting said plurality of fluid actuators and said pressure fluid source and including means to permit pressure fluid flow to selected ones of said actuators in a pattern corresponding to the positioning of said handle, a fluid flow sensor actuated to a first condition when fluid is flowing through said selector valve and to a second condition when no flow is occurring thereby indicating said fluid actuators have set the transmission in the drive ratio corresponding to the positioning of said handle, and means for adjusting said first pressure regulator toward the closed position in response to said handle being moved toward the first point within any of said positions and adjusting said regulator toward the open position in response to said handle being moved toward the second point within any of said positions and in response to said flow sensor being actuator to said second condition whereby said modulated clutch is disengaged as an incident to shifting the drive ratio of the transmission and only reengaged after the shifting is completed.

2. In a system for driving a load from a prime mover including a multi-drive ratio transmission and a modulated clutch drivingly connected between the prime mover and the load, a modulating actuator connected for engaging said modulated clutch when supplied with pressure fluid and to a degree proportional to the pressure of the fluid supplied thereto, a source of pressure fluid, a first fluid conduit connecting said modulating actuator and said pressure fluid source, first and second pressure regulators individually adjustable between the open and closed positions and connected in said first conduit, a plurality of fluid actuators adapted when energized in various patterns to set said transmission in the drive ratios, a plurality of second fluid conduits each connecting with a fluid actuator, a first control member including a handle movable to a plurality of positions each corresponding to one of the drive ratios of the transmission, said handle being movable between a first point and a second point when disposed in each of said positions, a selector valve connecting said plurality of second fluid conduits and said source of pressure fluid and including means for supplying pressure fluid to selected ones of said fluid actuators in response to movement of said handle to said positions thereby to energize said actuators in a pattern and set said transmission to the drive ratio corresponding to the positioning of the handle, means connecting said handle and first pressure regulator for adjusting the pressure regulator toward the closed position when the handle is moved toward the first point within any of said positions, signal means actuated to a first condition when said transmission is set into one of its drive ratios, and means to adjust said first pressure regulator toward the open position only after said handle is moved toward said second point within one of said positions and after said signal means is actuated to the first condition whereby said modulated clutch is automatically disengaged when said handle is moved to shift the transmission and is prevented from reengaging until after said shifting is completed.

3. In a system for driving a load from a prime mover including a multi-drive ratio transmission and a modulated clutch drivingly connected between the prime mover and the load, a modulating actuator connected for engaging said modulated clutch when supplied with pressure fluid and to a degree proportional to the pressure of the fluid supplied thereto, a plurality of actuators adapted when energized in various patterns to shift the transmission into one of the drive ratios, a first control member movable to a plurality of positions each corresponding to a transmission drive ratio and including means to energize said actuators in a pattern to shift the transmission to the drive ratio corresponding to the positioning of the control member, said control member being adjustable through a predetermined range of movement within each of said positions, first and second fluid pressure regulators adjustable between the open and closed positions, means to slow the actuation of said first regulator when adjusted from the closed to the open position, a fluid conduit connecting said first and second pressure regulators and said modulating actuator, means to supply pressure fluid to said fluid conduit, means connecting said first control member and said first pressure regulator for adjusting said regulator between the opened and closed positions when said control member is adjusted back and forth within said range, and a second control member for adjusting said second pressure regulator whereby the pressure of the fluid supplied to said modulating actuator may be varied by adjusting either pressure regulator and the modulated clutch is always disengaged when the first control member is moved between positions to shift the drive ratio of the transmission and slowly reengaged after the control member shifts the transmission.

4. In a system for driving a load from a prime mover including a multi-drive-ratio transmission and a modulated clutch drivingly connected between the prime mover and the load, a modulating actuator for engaging said modulated clutch when supplied with pressure fluid and to a degree proportional to the pressure of the fluid supplied thereto, a plurality of actuators adapted when energized in various patterns to shift the transmission into one of the drive ratios, a first control member movable to a plurality of positions each corresponding to a transmission drive ratio and including means to energize said actuators in a pattern to shift the transmission to the drive ratio corresponding to the positioning of the control member, said control member being adjustable through a predetermined range of movement within each of said positions, first and second fluid pressure regulators proportionally adjustable between the open and closed positions, a fluid conduit connecting said first and second pressure regulators and said modulating actuator, means to supply pressure fluid to said fluid conduit, means connecting said first control member and said first pressure regulator for adjusting said regulator between the open and closed positions when said control member is adjusted back and forth within said range, and a second control member for adjusting said second pressure regulator, whereby the pressure of the fluid supplied to said modulating actuator may be varied by adjusting either pressure regulator and the modulated clutch is always disengaged when the first control member is moved sufficiently far within said range to permit shifting of the drive ratio of the transmission.

5. In a system for driving a load from a prime mover including a modulated clutch and a multi-drive-ratio transmission drivingly interposed in tandem between the prime mover and the load, a modulating actuator for engaging the modulated clutch when energized and to a degree proportional to the pressure of the energizing fluid received, a supply of energizing fluid, conduit means connecting said source to said modulating actuator, first and second fluid pressure regulating means serially connected within said conduit means and each operable to move between open and closed positions and to any position intermediate the open and closed positions to control the pressure of energizing fluid to said modulating actuator, a first movable control member adjustable to a plurality of positions and including means to shift the transmission to a drive ratio corresponding to each position, means for closing said first pressure regulating means to disengage the modulated clutch while said transmission is being shifted to a new drive ratio, and a second movable control member connected to actuate said second pressure regulating means whereby the degree of engagement of said clutch can be controlled by either of said control members.

6. In a system for driving a load from a prime mover including a multi-drive-ratio transmission and a modulated clutch drivingly connected between the prime mover and the transmission, a modulating actuator connected for engaging the modulated clutch when supplied with pressure fluid and to a degree proportional to the pressure of the fluid supplied thereto, an actuator operable when energized to shift the transmission drive ratio, a first control member adjustable to a plurality of positions corresponding to the transmission drive ratios and including means for energizing said actuator to shift the transmission to the drive ratio corresponding to the position of said control member, said first control member being movable between first and second points when disposed in each of said positions, a fluid conduit connecting with said modulating actuator, a source of pressure fluid of sufficient pressure to actuate said modulating actuator and engage said modulated clutch connected to supply pressure fluid to said fluid conduit, first and second adjustable fluid pressure regulators connected in said fluid conduit between said source and said modulating actuator, means connecting said first control member and said first pressure regulator to adjust said first pressure regulator in response to said first control member being moved between said first and second points within any of said positions, and a second control member connected to adjust said second pressure regulator whereby the pressure supplied to the modulated clutch and therefore the modulated clutch engagement is proportional to the setting of whichever of said first and second control members is set for less engagement of the clutch.

7. In a system for driving a load from a prime mover, the combination comprising means including a modulated clutch and a multi-drive-ratio transmission drivingly interposed in tandem between the prime mover and the load, said transmission having a plurality of clutches selectively engageable to establish any one of a plurality of drive ratios through the transmission, a plurality of fluid actuators and means responsive to pressure fluid flow to selected ones of said actuators to engage selected clutches, a supply of pressure fluid, valve means adapted to supply to selected ones of said actuators pressure fluid from said source to shift said transmission, means for sensing and signaling pressure fluid flow to any of said fluid actuators, a modulating fluid actuator including means to engage said modulated clutch in response to pressure fluid supplied thereto and to a degree proportional to the pressure of said fluid, a conduit connecting said modulating actuator and pressure fluid supply including first and second pressure regulating means for varying the pressure of the fluid supplied to the modulating actuator to thereby vary the degree of engagement of the modulated clutch, means to stop the flow of pressure fluid to said modulated clutch actuator in response to said means signaling pressure fluid flow to any of the fluid actuators and, means to initiate fluid flow to said modulated clutch when said means signals there is no pressure fluid flow to any of the fluid actuators, whereby said modulated clutch will always be disengaged when any of said transmission clutches are being engaged.

8. In a system for driving a load from a prime mover including a modulated clutch and a multi-drive-ratio transmission drivingly interposed between the prime mover and the load, a modulating actuator for engaging the modulated clutch when activated by activating fluid and to a degree proportional to the amount of activating fluid received, a source of activating fluid, a conduit connected for conveying activating fluid from said source to said actuator, first and second adjustable regulating valves serially connected within said conduit and each adjustable from an open position toward a closed position and to positions intermediate said open and closed positions for varying the amount of activating fluid conveyed to said actuator through said conduit, a control assembly including a handle movable to a plurality of positions each corresponding to one of the transmission drive ratios and including means for shifting the transmission to that drive ratio in response to movement of the handle to the corresponding position, said control handle being adjustable through a predetermined range of movement and to various points within each of said positions, means to individually adjust said regulating valves to vary the engagement of the modulated clutch, and means to adjust said second regulating valve to stop the conveyance of activating fluid to the modulating actuator in response to adjustment of the handle to one extreme of said range of movement thereby to disengage the modulated clutch before shifting said transmission to a new drive ratio.

9. In a system for driving a load from a prime mover, the combination comprising means including a primary clutch and a multi-drive-ratio-transmission drivingly interposed in tandem between the prime mover and the load, said transmission having a plurality of clutches selectively engageable to establish any one of a plurality of drive ratios through the transmission, a plurality of fluid actuators and means responsive to pressure fluid flow to selected ones of said actuators to engage selected clutches, a supply of pressure fluid, selector valve means movable to various positions to supply to selected ones of said actuators pressure fluid from said source to shift said transmission, means for sensing and signaling pressure fluid flow to any of said fluid actuators, a primary fluid actuator including means to engage said primary clutch in response to the pressure of the fluid supplied thereto, conduit means connecting said primary actuator and said pressure fluid source including means to stop the flow of pressure fluid to the primary actuator when said sensing means signals pressure fluid flow to any of said fluid actuators and to again permit flow to the primary actuator when said sensing means stops signaling pressure fluid flow, and first and second regulating means connected with each other and operable to regulate the pressure of the fluid supplied to the modulating actuator through said conduit thereby to vary the degree of engagement of the modulated clutch.

10. In a system for driving a load from a prime mover including a modulated clutch and a multi-drive-ratio transmission drivingly interposed between the prime mover and the load, a modulating actuator connected for engaging said modulated clutch when supplied with pressure fluid and to a degree proportional to the pressure of the fluid supplied thereto, a source of pressure fluid, a fluid conduit connected for transmitting pressure fluid from the source to said modulating actuator, first and second adjustable pressure regulating valves in said conduit and connected in series with each other and with said source and said modulating actuator to vary the pressure of the fluid supplied through said conduit to said modulating actuator, a first control assembly including a handle movable to a plurality of positions corresponding to the drive ratios of the transmission, said handle also being movable to various points within each position without shifting the transmission and including means to adjust said first regulating valve in response to such in-position movement and to a degree proportional to such movement, and a second control assembly including means for adjusting said second regulating valve in response to movement thereof, whereby the engagement of said modulated clutch is proportional to the setting of whichever of said first and second control assemblies is set for less engagement of the clutch and said first control assembly handle may additionally be moved to shift the transmission drive ratio.

11. In a system for driving a load from a prime mover including a modulated clutch and a multi-drive-ratio transmission drivingly interposed between the prime mover and the load, a modulating actuator connected for engaging said modulated clutch when supplied with pressure fluid and to a degree proportional to the pressure of the fluid supplied thereto, a source of pressure fluid, a fluid conduit connected for transmitting pressure fluid from the source to said modulating actuator, first and second adjustable pressure regulating valves connected to vary the pressure of the fluid supplied through said conduit to said modulating actuator, a first control assembly including a handle movable to a plurality of positions corresponding to the drive ratios of the transmission, said handle also being movable to various points within each position without shifting the transmission and including means to adjust said first regulating valve in response to such in-position movement and to a degree proportional to such movement, a second control assembly including means for adjusting said second regulating valve in response to movement thereof, and means to maintain a charge of low pressure fluid in said fluid conduit when said pressure regulating valves are closed, whereby the engagement of said modulated clutch is proportional to the setting of whichever of said first and second control assemblies is set for less engagement of the clutch.

12. In a system for driving a load from a prime mover including a modulated clutch and a multi-drive ratio transmission drivingly interposed between the prime mover and the load, a modulating actuator connected for engaging said modulated clutch when supplied with activating fluid and to a degree proportional to the amount of activating fluid received, a source of activating fluid, a conduit connected for transmitting activating fluid from said source to said actuator, first and second adjustable regulating means connected to vary the pressure of activating fluid transmitted to said actuator through said conduit, each of said regulating means being adjustable between a maximum flow position and a minimum flow position and to positions intermediate said two positions, a first control assembly including a handle movable to a plurality of positions corresponding to the drive ratios of the transmission, said handle also being movable to various points within each position without shifting the transmission and including means to adjust said first regulating means between said minimum and maximum flow positions in response to such in-position movement, and a second control assembly including means to adjust said second regulating means in response to movement thereof whereby the degree of engagement of said modulated clutch may be effected by adjustment of either of said first and second control assemblies and said handle may additionally be moved to shift the transmission drive ratio.

13. In a system for driving a load from a prime mover including a modulated clutch drivingly interposed between the prime mover and the load, a modulating actuator for engaging said modulated clutch when supplied with pressure fluid and to a degree proportional to the pressure of the fluid supplied, first and second fluid pressure regulating valves each independently adjustable from an open position toward a closed position and to various rest positions intermediate said open and closed positions for varying the pressure of the fluid passing through the regulating valves, a flow conduit system connecting in series said first and second pressure regulating valves and said modulating actuator, means to supply activating fluid to said flow conduit system of sufficient pressure to completely engage said modulated clutch, and a hand operated control member and a foot operated control member each including means for adjusting said first and second regulating valves respectively in proportion to movement of said control members whereby the pressure of the fluid supplied to said modulating actuator and therefore the degree of engagement of said modulated clutch may be reduced by adjusting either of said control members.

14. In a system for driving a load from a prime mover including a modulated clutch drivingly interposed between the prime mover and the load, a modulating actuator for engaging said modulated clutch when supplied with pressure fluid and to a degree proportional to the pressure of the fluid, first and second fluid pressure regulating valves each independently adjustable to various open positions for varying the pressure of the fluid passing through the valves, a source of activating fluid, a flow conduit system connecting in series said source, said first and second pressure regulating valves and said modulating actuator, means to supply activating fluid from said source to said flow conduit system of sufficient pressure to completely engage said modulated clutch, and means to individually adjust said first and second regulating valves to said various open positions whereby the pressure of the fluid supplied to said modulating actuator and therefore the degree of engagement of said modulated clutch is proportional to whichever of said first and second pressure regulating valves is adjusted to the lesser pressure setting.

15. A system as defined in claim 14 wherein each of said valves has an inlet and an outlet and is selectively operable to gradually reduce the pressure of the fluid at the outlet, and wherein the inlet of one of said valves is connected to said source and the outlet is connected to the inlet of the other of said valves, the outlet of said other valve being connected to said modulating actuator.

References Cited
UNITED STATES PATENTS

| | | | |
|---|---|---|---|
| 2,159,170 | 5/1939 | Maybach | 192—85 |
| 2,537,409 | 1/1951 | Hassman et al. | 192—3.5 |
| 2,732,727 | 1/1956 | Livermore | 192—3.5 |
| 2,756,851 | 7/1956 | Collins | 192—3.5 |
| 2,775,328 | 12/1956 | Yokel | 192—85 |
| 2,939,557 | 6/1960 | Dabich et al. | 192—109 |

BENJAMIN W. WYCHE III, *Primary Examiner.*